UNITED STATES PATENT OFFICE.

NATHAN SULZBERGER, OF NEW YORK, N. Y.

ESTERS OF METACRESOL AND DERIVATIVES OF SAME WITH LOWER FATTY ACIDS.

1,031,971.  Specification of Letters Patent.  Patented July 9, 1912.

No Drawing.  Application filed February 10, 1909. Serial No. 477,080.

*To all whom it may concern:*

Be it known that I, NATHAN SULZBERGER, a citizen of the United States, and a resident of New York city, county, and State, have invented certain new and Improved Esters of Metacresol and Derivatives of Same with Lower Fatty Acids, of which the following is a specification.

Mono-hydric phenols and derivatives of the same have been found to be excellent antiseptics. The more general use however, of these bodies has been greatly impaired by their escharotic and irritating untoward action, and particularly for the reason also that the same have been found even in very weak solutions (such as for instance: when two per cent. or three per cent. solutions of carbolic acid were employed) to cause and produce necrobiosis and gangrene, especially when applied as wet dressings to the fingers and toes. Of these phenols—carbolic acid, ortho-, meta-, and para-cresol—meta-cresol has been generally found to possess the least toxicity; while at the same time showing the strongest bactericidal action. This phenol, however, possesses the above referred to untoward action while I have found its derivatives with fatty acids containing not more than three atoms of carbon, are practically devoid of this irritating and escharotic action, while such derivatives still possess the valuable properties of meta-cresol of an antiseptic and analgesic nature. These derivatives with lower fatty acids still retaining the volatility with water vapors of the free meta-cresol are therefore, since practically free from escharotic action, particularly valuable in the treatment of affections of the air- and breathing-passages, but of course, can be used for all such other purposes as well, where a preparation of an antiseptic nature is desired. Thus, meta-cresyl-acetate has been found particularly valuable in the treatment of infectious conditions of the nose, ear and throat as a topical remedy, in which cases it was almost always employed in its pure, undiluted condition representing about seventy-two per cent. of pure meta-cresol. Although used in its pure form, sloughing action has never been reported.

As a more explicit illustration of my invention I will here detail the same in connection with the preparation of the acetate of meta-cresol.

Freshly distilled meta-cresol boiling at about 201 degrees C. was treated with a slight excess over one molecule of acetyl-chlorid, the addition being performed through the tube of a reflux condenser, since the great volume of hydrochloric acid evolved in the reaction would otherwise tend to carry off considerable acetyl-chlorid and render a great excess necessary. After the acetyl-chlorid had been added, the liquid was slightly heated for about one-half hour and after removing the reflux condenser the excess of the chlorid was driven off. On distilling, the thermometer rose rapidly to about 214 degrees (uncorrected) when the meta-cresyl acetate boiled over as a water-white liquid of aromatic odor with very little residue remaining. The resultant product represents a liquid possessing antiseptic and analgesic action while practically devoid from any escharotic effect. The same is volatile with water-vapors and can also be distilled without decomposition under ordinary pressure. When treated with bromin in one molecular proportion in its solution in glacial acetic acid, the bromin being added drop by drop, it does not produce a precipitate with every added drop of bromin which immediately again disappears on shaking, which precipitate crystallizes after cooling out of the products of reaction in colorless needles with silky luster which melt at 83 degrees C. (uncorrected). Caustic soda will split this acetate into its component parts, *i. e.*, acetic acid and meta-cresol. In a similar manner other products coming under the scope of this invention can be produced by treating meta-cresol or a derivative of the same with the chlorid of the lower fatty acid, or with the chlorid of a derivative of such lower fatty acid.

On account of their stability, the herein disclosed compounds can be also used and diluted with fats, oils, soap, vaseline, lanolin, paraffin and other unguents, and may also be embodied in salves containing other chemicals as oxid of zinc, etc., or may be otherwise employed in connection with substances having the property of materially promoting their penetrating action, *i. e.*, their rapid absorption by the tissues. These compounds can also be dispensed as solids or semi-solids in collapsible tubes or the like, if their liquid form is not preferred. The isolated individual meta-cresyl acetate, like other compounds in this invention can be employed with great and pronounced success in density (especially since they possess marked analgesic action), not producing escharosis like their parent, even on the very sensitive mucous membranes of the tongue and mouth, even when used in their undiluted and chemically pure form. They may also be perfumed or otherwise odorized, either in the pure form or when mixed with unguents, by means of the essential oils such for instance as peppermint, cloves, eucalyptus, cinnamon, etc., so as to suit the individual taste. They may also even be mixed with water and used as a milky emulsion. They also possess characteristic not unpleasant aromatic odors which, in most cases, are more agreeable and less pungent than that of the original meta-cresol from which they are derived.

Viewed in the light of current knowledge, the foregoing very complete disclosure will suggest further modifications of my invention especially qualified to meet the various conditions which may from time to time arise; hence further elaboration on my part is deemed unnecessary. I desire it to be understood, however, that all such modifications, as well as all other generic and specific embodiments relating to or growing out of this disclosure and which from the aspect of the prior art display distinguishing characteristics, are to be regarded as comprehended within the scope of the following claims.

I claim:

1. Meta-cresyl acetate conforming in structure to the symbol

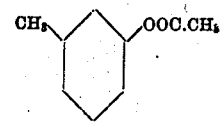

and representing a liquid distilling at about 214 degrees C. without decomposition; volatile with water-vapors; split into sodium-acetate and sodium-meta-cresolaté by the action of caustic soda; not producing a precipitate with bromin as same is added drop by drop in one molecular proportion to its solution in glacial acetic acid, which precipitate after cooling, crystallizes out of the products of reaction in colorless needles with silky luster which melt at 83 degrees.

2. Derivatives of meta-cresol with lower fatty acids, having three or less than three atoms of carbon,—split by the action of caustic soda into their component parts, their solution in glacial acetic-acid remaining clear when treated with bromin in one molecular proportion as the same is added drop by drop.

In testimony whereof, I have hereunto affixed my signature in the presence of two subscribing witnesses.

NATHAN SULZBERGER.

Witnesses:
NATHAN GRABENHEIMER,
MICHAEL S. LOEB.